(12) United States Patent
Crume

(10) Patent No.: US 8,641,815 B2
(45) Date of Patent: Feb. 4, 2014

(54) CERAMIC COMPOSITIONS FOR IMPROVED EXTRUSION

(75) Inventor: Gregg William Crume, Canandaigua, NY (US)

(73) Assignee: Corning Incorporated, Corning, NY (US)

(*) Notice: Subject to any disclaimer, the term of this patent is extended or adjusted under 35 U.S.C. 154(b) by 527 days.

(21) Appl. No.: 13/036,682

(22) Filed: Feb. 28, 2011

(65) Prior Publication Data

US 2012/0220444 A1 Aug. 30, 2012

(51) Int. Cl.
*C08L 5/00* (2006.01)
*C08L 5/04* (2006.01)
*C08L 1/00* (2006.01)
*C08L 1/28* (2006.01)
*C04B 35/634* (2006.01)
*C04B 35/636* (2006.01)
*C08L 71/12* (2006.01)
*C08L 39/06* (2006.01)

(52) U.S. Cl.
CPC ... *C08L 5/00* (2013.01); *C08L 5/04* (2013.01); *C08L 1/00* (2013.01); *C08L 1/28* (2013.01); *C08L 71/12* (2013.01); *C08L 39/06* (2013.01); *C04B 35/634* (2013.01); *C04B 35/636* (2013.01); *C04B 35/6365* (2013.01); *C04B 35/63444* (2013.01); *C04B 35/63488* (2013.01); *C04B 2235/30* (2013.01); *C04B 2235/6021* (2013.01)

USPC ............ 106/162.8; 106/162.9; 501/134; 524/28; 524/35; 524/43; 524/44

(58) Field of Classification Search
USPC ......... 106/162.8, 162.9; 501/134; 524/28, 35, 524/43, 44, 55
See application file for complete search history.

(56) References Cited

U.S. PATENT DOCUMENTS

| 3,305,369 | A * | 2/1967 | Cuhra et al. .................. 106/1.19 |
| 4,983,563 | A * | 1/1991 | Chopin et al. ................. 502/150 |
| 5,132,255 | A * | 7/1992 | Takeuchi et al. ................. 501/94 |
| 5,221,790 | A * | 6/1993 | Besnard et al. ............... 536/123 |
| 6,372,033 | B1* | 4/2002 | Chalasani et al. ......... 106/140.1 |
| 2010/0085897 | A1* | 4/2010 | Croak et al. ................... 370/254 |
| 2012/0198805 | A1* | 8/2012 | Iwasaki et al. ................. 55/523 |
| 2012/0220445 | A1* | 8/2012 | Uoe et al. ...................... 501/134 |

FOREIGN PATENT DOCUMENTS

| EP | 0296932 | 10/1991 | ............ C04B 35/00 |
| EP | 2371785 | 10/2011 | ............ C04B 35/111 |
| WO | 99/07652 | 2/1999 | ............ C04B 35/622 |

* cited by examiner

*Primary Examiner* — David M Brunsman
(74) *Attorney, Agent, or Firm* — Charles A. Greene; Matthew J. Mason

(57) ABSTRACT

A precursor batch composition that can be used to make porous ceramic articles is provided. In addition to a cellulosic binder and an aqueous solvent, the batch composition includes a polysaccharide gum. The batch composition may optionally include a linear water soluble polymer having a molecular weight of at least one million Daltons.

20 Claims, No Drawings

CERAMIC COMPOSITIONS FOR IMPROVED EXTRUSION

BACKGROUND

The disclosure relates generally to ceramic precursor batch compositions and more particularly to ceramic precursor batch compositions and batches for forming ceramic honeycombs.

In the formation of ceramic bodies, e.g., silicon carbide, cordierite, mullite, alumina, or aluminum titanite bodies, plasticized mixtures of various inorganic powder batches are prepared which are then formed into various shapes. These plasticized mixtures should be well blended and homogeneous in order for the resulting shaped body to have relatively good integrity in both size and shape, and uniform physical properties. These mixtures typically further include organic additives such as binders, plasticizers, surfactants, lubricants, and dispersants as processing aids to enhance cohesion, plasticity, lubricity, and/or wetting, and therefore to produce a more uniform batch.

Cellulose ethers have been used as extrusion binders to impart plasticity while imparting good drying behavior. While other ceramic binder systems can also be used for ceramic extrusion, cellulose ethers such as methylcellulose (MC), hydroxypropylcellulose (HPMC) and hydroxyethylmethylcellulose (HEMC) can form high temperature gels. The gelling behavior facilitates rapid drying while preventing distortions that can occur with other binder systems as they are heated. A major draw back of these systems relates to process temperature limitations.

When using cellulose ethers as binder materials, process temperatures must be kept below the gelation temperature of the batch, otherwise the batch loses plasticity and is not suitable for making cost effective components. While a variety of cellulose ethers are commercially available with a range of gelation temperatures, using a higher gel temperature binder results in decreased wet stiffness and strength, as well as decreased drying performance. In addition, higher gel point cellulose ethers not only dry slower than lower gel point products but can also be more prone to "case hardening", a condition in which skin with low water vapor permeability forms on the surface which slows drying and traps water vapor. The trapped vapor may escape explosively from the part upon drying, causing defects such as blisters.

Increasing the binder content can improve plasticity and wet strength, but results in a higher binder to water ratio that lowers the gelation temperature of the batch. In addition, properties intermediate to those obtained with commercially available MC's and HPMC's can be achieved by blending, but it has not been shown to be possible to obtain higher gelation temperatures while improving plasticity, increasing stiffness and maintaining superior drying behavior with blends.

SUMMARY

One embodiment of the disclosure relates to a ceramic precursor batch composition. The ceramic precursor batch composition includes inorganic ceramic-forming ingredients, a cellulose-based binder, an aqueous-based solvent, and a polysaccharide gum.

Another embodiment of the disclosure relates to a method of producing a ceramic precursor batch composition. The method includes compounding inorganic ceramic-forming ingredients, a cellulose-based binder, an aqueous-based solvent; and a polysaccharide gum.

Yet another embodiment of the disclosure relates to a method of producing a porous ceramic article. The method includes compounding a ceramic precursor batch composition that includes inorganic ceramic-forming ingredients, a cellulose-based binder, an aqueous-based solvent, and a polysaccharide gum. The method also includes forming an extruded green body from the ceramic precursor batch composition. In addition, the method includes firing the extruded green body to produce a porous ceramic article.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

DETAILED DESCRIPTION

Various embodiments of the disclosure will be described in detail.

"Gelation temperature" refers to the temperature at which a batch has stiffened to such an extent that it cannot effectively be extruded.

"$T_{onset}$" refers to the temperature at which the rheology of the batch begins to transition from low to high viscosity.

Embodiments disclosed herein incorporate the use of one or more polysaccharide gums as additives to ceramic precursor batch compositions containing one or more cellulose-based binders. Embodiments disclosed herein may also optionally contain a linear water soluble polymer having a molecular weight of at least one million Daltons.

Compositions disclosed herein can, in exemplary embodiments, provide for extruded green bodies having improved mechanical properties such as strain to break, peak tensile load, and increased stiffness (enabling increased bulk yield), without substantially lowering $T_{onset}$, substantially increasing extrusion pressure, or substantially adversely affecting drying performance.

The addition of one or more polysaccharide gums can enable use of higher $T_{onset}$ cellulose-based binders, such as hydroxypropylmethylcellulose (HPMC), while generally maintaining or improving batch stiffness and plasticity.

In exemplary embodiments, the polysaccharide gums include those that are temperature stable, have high viscosity, and low sensitivity to salt. The gums may also include those having a helical molecular structure.

Examples of polysaccharide gums that can be used in embodiments disclosed herein include, but are not limited to, Scleroglucans, Duitan Gums, Welan Gums, Rhamsan Gums, Gellan Gums, Xanthan Gums, Alginate Gums, Carrageenan Gums and Locust Bean Gums. Combinations of one or more of the above gums or combinations of one or more of the above gums with other gums may also be used, such as a combination of a Xanthan Gum and a Guar Gum. Such gums or combinations of gums can provide increased extrudate stiffness without substantially increasing the extrusion pressure.

In exemplary embodiments, the polysaccharide gum or combination of gums is present in the ceramic precursor batch composition in an amount of at least 0.1% on a weight percent by super addition basis, such as an amount ranging from about 0.1% to about 3.0% on a weight percent by super addition basis, and further such as an amount ranging from about 0.5% to about 2.0%, on a weight percent by super addition basis.

The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic body.

In one set of exemplary embodiments, the inorganic ceramic-forming ingredients may yield an aluminum-titanate ceramic material upon firing. In other exemplary embodiments, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

The cellulose-based binder may be, but not limited to, a cellulose ether. The cellulose-based binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and mixtures thereof. Methylcellulose and/or methylcellulose derivatives may be especially suited as organic binders in the practice of the present invention with methylcellulose, hydroxypropyl methylcellulose, or combinations of these being preferred. Preferred sources of cellulose ethers are Methocel A4M, F4M and F240 cellulose products from Dow Chemical Co. Methocel A4M cellulose is a methylcellulose while Methocel F4M, F240, E4M, E40M and K75M cellulose products are hydroxypropyl methylcellulose.

The cellulose-based binder can be present in the ceramic precursor batch composition in an amount of at least 1.0% on a weight percent by super addition basis, such as an amount ranging from about 1.0% to about 5.0% on a weight percent by super addition basis, and further such as an amount ranging from about 2.0% to about 4.0%, on a weight percent by super addition basis.

The properties of exemplary cellulose-based binders such as methylcellulose may be water retention, water solubility, surface activity or wetting ability, thickening of the mixture, providing wet and dry green strength to the green bodies, thermal gelation and hydrophobic association in an aqueous environment. Cellulose ether binders that promote hydrogen bonding interaction with the solvent may be desirable. Non-limiting examples of substituent groups that maximize the hydrogen bonding interaction with polar solvents e.g. water, may be hydroxypropyl and hydroxyethyl groups, and to a smaller extent, hydroxybutyl groups.

The solvent may provide a medium for the binder to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous solvent may be from about 18% by weight to about 50% by weight, on a weight percent by super addition basis.

The ceramic precursor batch composition may further comprise other additives such as surfactants, oil lubricants and pore-forming material. Non-limiting examples of surfactants that may be used in certain exemplary embodiments include $C_8$ to $C_{22}$ fatty acids and/or their salts or derivatives. Additional surfactant components that may be used with these fatty acids include $C_8$ to $C_{22}$ fatty esters, $C_8$ to $C_{22}$ fatty alcohols, and combinations of these. Exemplary surfactants include stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.25% by weight to about 2% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

The ceramic precursor batch composition may also comprise a linear, water soluble polymer having a molecular weight of at least one million Daltons, such as a linear water soluble polymer having a molecular weight of between one million and ten million Daltons, and further such as a linear water soluble polymer having a molecular weight of between two million and six million Daltons, including a linear water soluble polymer having a molecular weight of about four million Daltons. Examples of such polymers include polyethylene oxide (POE) polyacrylate, polymethacrylate and polyvinlypyrrolidone (PVP).

When present, the linear water soluble polymer can be present in the ceramic precursor batch composition in an amount of at least 0.1% on a weight percent by super addition basis, such as an amount ranging from about 0.1% to about 2.0% on a weight percent by super addition basis, and further such as an amount ranging from about 0.5% to about 1.5%, on a weight percent by super addition basis.

In filter applications, such as in diesel particulate filters, it may be desirable to include a pore forming material in the mixture in an amount effective to subsequently obtain the porosity required for efficient filtering. A pore forming material is any particulate substance (not a binder) that burns out of the green body in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. The pore forming material may be up to about 60% by weight as a superaddition. Typically, the amount of graphite may be from about 10% to about 30%, and more typically about 15% to about 30% by weight based on the inorganic ceramic-forming ingredients. If a combination of graphite and flour are used, the amount of pore forming material may be typically from about 10% by weight to about 25% by weight with the graphite at 5% by weight to 10% of each and the flour at 5% by weight to about 10% by weight.

The disclosure also provides a method of producing a ceramic honeycomb body, comprising the steps of compounding inorganic ceramic-forming ingredients, a cellulose-based binder, an aqueous based solvent and a polysaccharide gum. The inorganic materials, binder, solvent and polysaccharide gum may be mixed in a muller or plow blade mixer. The solvent may be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, polysaccharide gum, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles. In the presence of inorganic colloids, the polysaccharide gums can flocculate the colloids leading to a synergistic increase in extrudate stiffness. In the absence of fine colloids, or fine colloid interactions, the polysaccharides can form a gel network in the solvent phase that can produce a stiff extrusion body.

In a further step, the composition may be extruded to form a green honeycomb body. Extrusion may be done with devices that provide low to moderate shear. For example hydraulic ram extrusion press or two stage de-airing single auger are low shear devices. A single screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, may be those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses may be from about 0.07 to about 0.6 mm (about 3 to about 25 mils), although thicknesses of about 0.02-0.048 mm (1-2 mils) are possible with better equipment. Methods disclosed herein may be especially suited for extruding thin wall/high cell density honeycombs.

The extrudates may then be dried and fired according to known techniques. The firing conditions of temperature and time may depend on the composition and size and geometry of the body, and embodiments herein are not limited to specific firing temperatures and times. For example, in compositions which are primarily for forming cordierite, the temperatures may typically be from about 1300° C. to about 1450° C., and the holding times at these temperatures may be from about 1 hour to about 6 hours. For mixtures that are primarily for forming mullite, the temperatures may be from about 1400° C. to about 1600° C., and the holding times at these temperatures may be from about 1 hour to about 6 hours. For cordierite-mullite forming mixtures which yield the previously described cordierite-mullite compositions, the temperatures may be from about 1375° C. to about 1425° C. Firing times depend on factors such as kinds and amounts of materials and nature of equipment but typical total firing times may be from about 20 hours to about 80 hours. For metal bodies, the temperatures may be about 1000° C. to 1400° C. in a reducing atmosphere preferably hydrogen. Firing times depend on factors as discussed above but may be typically at least 2 hours and typically about 4 hours. For zeolite bodies, the temperatures may be about 400° C. to 1000° C. in air. Firing times depend on factors as discussed above but may be typically about 4 hours.

EXAMPLES

The disclosure and scope of the appended claims will be further clarified by the following examples.

Two cordierite ceramic precursor batch compositions (Comparative Example 1 and Example 1) were mixed having the ingredients present in the ranges or amounts set forth in Table 1, wherein the amounts of inorganic ingredients were the same. Comparative Example 1 did not contain a polysaccharide gum or linear water soluble polymer whereas Example 1 contained both (Actigum and PolyOx 301).

TABLE 1

Batch composition ingredients

| | Comparative Example 1 | Example 1 |
|---|---|---|
| Inorganic Ingredients (wt %) | | |
| Talc | 38-42 | 38-42 |
| Calcined kaolin clay | 16-20 | 16-20 |
| Hydrous kaolin clay | 14-18 | 14-18 |
| Calcined alumina | 12-16 | 12-16 |
| Fine alumina | 4-6 | 4-6 |
| Silica (Imsil) | 6-8 | 6-8 |
| Organic/Other Ingredients (wt % superaddition basis) | | |
| Cellulose ether (hydroxypropyl-methylcellulose) | 2.90 | 2.90 |
| Stearic acid (Emersol 120) | 0.70 | 0 |
| Scleroglucan (Actigum) | 0 | 0.70 |
| Polyethylene oxide (PolyOx 301) | 0 | 0.70 |
| Synthetic oil (Durasyn 162) | 6.00 | 6.00 |
| Water | 21.00 | 21.00 |

The compositions set forth in Table 1 were extruded and formed into cylindrical-shaped green bodies with honeycomb cross sections. The cylindrical-shaped green bodies had a diameter of about 2 inches, with 400 cells per square inch and a web thickness of 4 mils.

The extruded green bodies were tested to have properties set forth in Table 2. Tensile tests samples were cut from 3.3 mm thick, 15 mm wide extruded ribbons using a steel rule die. Test samples had a gage section that was 43 mm wide and 115 mm long. Tests were performed on an Instron 3366 load frame with a crosshead speed of 1 mm/sec. Squeeze flow tests were performed using a ½ inch diameter compression platens on the same Instron load frame with a cross head speed of 0.333 mm/sec.

TABLE 2

Extruded green body properties of the compositions set forth in Table 1

| Property | Comparative Example 1 | Example 1 |
| --- | --- | --- |
| Peak Load (KPa) | 171 | 246 |
| Elongation at break (%) | 8.87 | 13.71 |
| Young's Modulus (0.2-2.5% elongation) (MPa) | 4.61 | 5.02 |
| Secant Modulus (MPa) | 2.59 | 2.67 |
| Yield Strength (KPa) | 481 | 612 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A ceramic precursor batch composition comprising:
   inorganic ceramic-forming ingredients;
   a cellulosic binder;
   an aqueous solvent; and
   a polysaccharide gum.

2. The composition of claim 1, wherein the composition further comprises a linear water soluble polymer having a molecular weight of at least one million Daltons.

3. The composition of claim 2, wherein the linear water soluble polymer having a molecular weight of at least one million Daltons comprises at least one polymer selected from the group consisting of polyethylene oxide (POE) and polyvinylpyrrolidone (PVP).

4. The composition of claim 1, wherein the polysaccharide gum is present in the composition in an amount ranging from about 0.1% to about 3.0% on a weight percent by super addition basis.

5. The composition of claim 2, wherein the water soluble polymer is present in the composition in an amount ranging from about 0.1% to about 2.0% on a weight percent by super addition basis.

6. The composition of claim 1, wherein the polysaccharide gum comprises at least one gum selected from the group consisting of a Scleroglucan, a Duitan Gum, a Welan Gum, a Rhamsan Gum, a Gellan Gum, a Xanthan Gum, an Alginate Gum, a Carrageenan Gum, and a Locust Bean Gum.

7. The composition of claim 1, wherein the cellulose-based binder is present in the composition in an amount ranging from about 1.0% to about 5.0% on a weight percent by super addition basis.

8. The composition of claim 1, wherein the cellulose binder comprises at least one cellulose ether selected from the group consisting of methylcellulose (MC), hydroxypropylmethylcellulose (HPMC), and hydroxyethylcellulose (HEMC).

9. The composition of claim 1, wherein the composition comprises cordierite-forming ingredients.

10. The composition of claim 1, wherein the composition comprises aluminum titanate-forming ingredients.

11. The composition of claim 1, wherein, subsequent to extrusion to an extruded green body, the extruded green body has a percent elongation at break of at least 10% and a yield strength of at least 600 KPa.

12. A method of producing a ceramic precursor batch composition, the method comprising compounding:
    inorganic ceramic-forming ingredients;
    a cellulosic binder;
    an aqueous solvent; and
    a polysaccharide gum.

13. The method of claim 12, wherein the method further comprises compounding a linear water soluble polymer having a molecular weight of at least one million Daltons.

14. The method of claim 12, wherein the polysaccharide gum comprises at least one gum selected from the group consisting of a Scleroglucan, a Duitan Gum, a Welan Gum, a Rhamsan Gum, a Gellan Gum, a Xanthan Gum, an Alginate Gum, a Carageenan Gum and a Locust Bean Gum.

15. The method of claim 12, wherein the polysaccharide gum is present in the composition in an amount ranging from about 0.1% to about 3.0% on a weight percent by super addition basis.

16. A method of producing a porous ceramic article, the method comprising:
    compounding a ceramic precursor batch composition, the ceramic precursor batch composition comprising:
      inorganic ceramic-forming ingredients;
      a cellulosic binder;
      an aqueous solvent; and
      a polysaccharide gum;
    forming an extruded green body from the ceramic precursor batch composition;
    firing the extruded green body to produce a porous ceramic article.

17. The method of claim 16, wherein the ceramic precursor batch composition further comprises a linear water soluble polymer having a molecular weight of at least one million Daltons.

18. The method of claim 16, wherein the polysaccharide gum comprises at least one gum selected from the group consisting of a Scleroglucan, a Duitan Gum, a Welan Gum, a Rhamsan Gum, a Gellan Gum, a Xanthan Gum, an Alginate Gum, a Carageenan Gum and a Locust Bean Gum.

19. The method of claim 16, wherein the polysaccharide gum is present in the composition in an amount ranging from about 0.1% to about 2.0% on a weight percent by super addition basis.

20. The method of claim 16 wherein, subsequent to extrusion to an extruded green body, the extruded green body has a percent elongation at break of at least 10% and a yield strength of at least 600 KPa.

* * * * *